Jan. 27, 1925.
J. E. SPEER
CAM
Filed Oct. 24, 1923
1,524,461
2 Sheets-Sheet 1
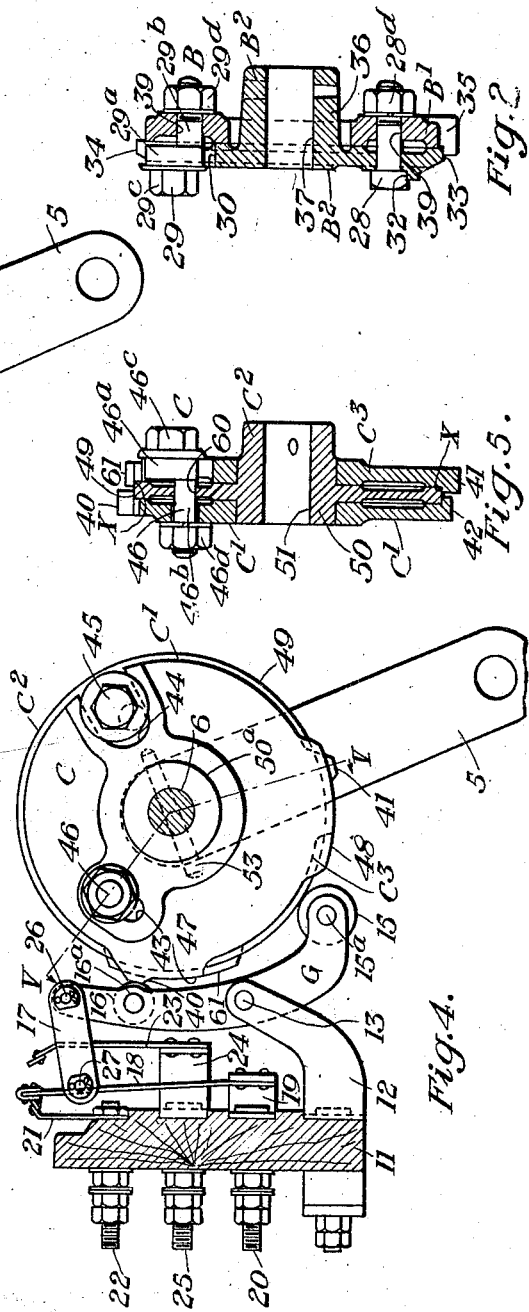
INVENTOR:
James E. Speer,
by A. L. Vencill
His Attorney Jan. 27, 1925.　　　　　　　　　　　　　　　　　　1,524,461
J. E. SPEER
CAM
Filed Oct. 24, 1923　　　2 Sheets-Sheet 2

INVENTOR:
James E. Speer,
by A. L. Vencill,
His attorney

Patented Jan. 27, 1925.

1,524,461

UNITED STATES PATENT OFFICE.

JAMES E. SPEER, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

CAM.

Application filed October 24, 1923. Serial No. 670,473.

*To all whom it may concern:*

Be it known that I, JAMES E. SPEER, a citizen of the United States, residing at Pittsburgh, in the county of Allegheny and State of Pennsylvania, have invented certain new and useful Improvements in Cams, of which the following is a specification.

My invention relates to cams and particularly to cams adapted for operating a circuit controller.

I will describe two forms of cams embodying my invention, and will then point out the novel features thereof in claims.

Figure 3:
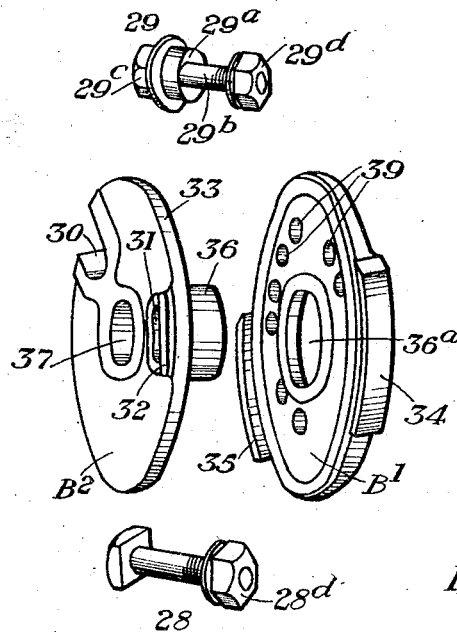
Figure 6:
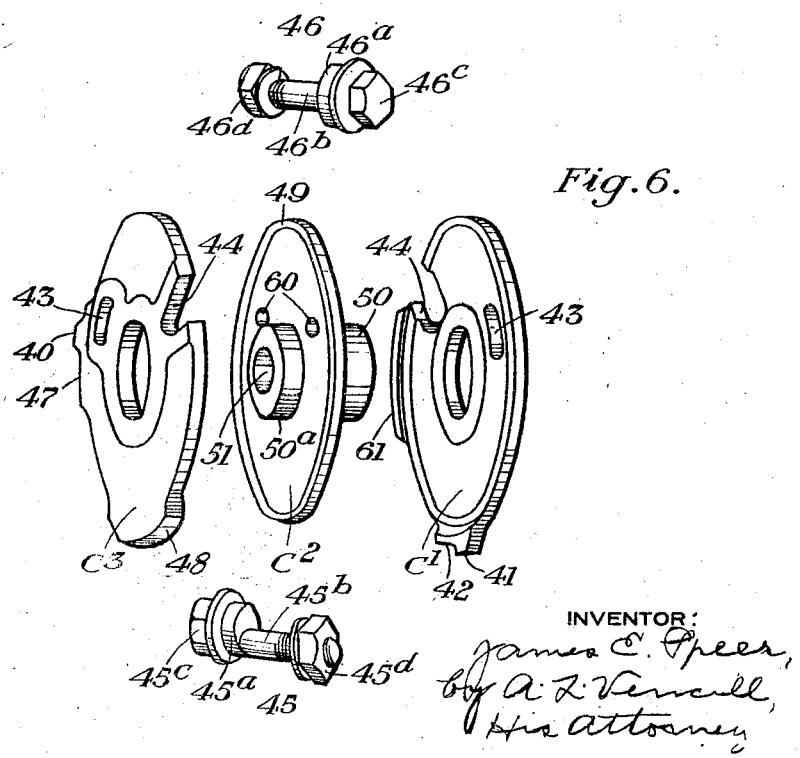

In the accompanying drawings, Fig. 1 is a view showing a circuit controller including one form of cam embodying my invention. Fig. 2 is a sectional view on the line II—II of Fig. 1. Fig. 3 is an exploded view showing in perspective, the component parts of cam B of Fig. 1. Fig. 4 is a view showing another circuit controller including a modified form of cam also embodying my invention. Fig. 5 is a sectional view on the line V—V of Fig. 4. Fig. 6 is an exploded view showing the parts of cam C.

Similar reference characters refer to similar parts in each of the several views.

Referring first to Figs. 1, 2 and 3, the reference character B designates a cam comprising two cam members B′ and B². Member B² is substantially circular and is provided at its center with an outstanding hub 36 pierced by a hole 37 to accommodate a shaft 6. Member B³ and shaft 6 are rigidly connected together by means of a taper pin 53 which passes through hub 36 and shaft 6. Member B′ is provided with an aperture 36ᵃ to receive hub 36 of member B², and with two cam surfaces 34 and 35 spaced on its periphery and outstanding beyond the edge of member B² when the cam is assembled. As best shown in Fig. 3, surfaces 34 and 35 of member B′ are of greater width than the body of this member, and extend over the edge of member B² thus serving to maintain the two members in proper concentric positions. The cam members are fastened together by means of two bolts 28 and 29. A plurality of holes 39 are provided in member B′ to accommodate the shanks of these bolts. Bolt 29 comprises a shank 29ᵇ which passes through a hole 39 in member B′, and an eccentric shoulder 29ᵃ which is seated in a U-shaped slot 30 in member B². A segmental slot 31 is provided in member B² to accommodate bolt 28 which passes through a second hole 39 in member B′. Bolt 28 is restrained from turning by an upstanding rib 32 adjacent slot 31 and against which the head of bolt 28 abuts.

Referring particularly to Fig. 1, a contact mechanism is supported on a plate 11 of insulating material and is arranged to be operated by cam B. This mechanism comprises a supporting leg 12 fastened to plate 11. Carried on a pivot pin 13 passing through leg 12 is an operating arm structure G comprising a pair of lever arms 14 having holes through which pin 13 passes. As shown in Fig. 1, one arm 14 is directly behind the other and therefore only one is visible. At one extremity of these two arms 14 is a roller 15 supported by a rivet 15ᵃ, and a similar roller 16 is supported by a rivet 16ᵃ near the other end of these arms. The parts are so proportioned that rollers 15 and 16 engage the peripheral surface of cam B. The extremity of structure G adjacent roller 16 is provided with a transversely extending pin 26 which is connected by means of link 17 and pin 27 with a contact finger 18. The finger 18 is supported on plate 11 by means of a bracket 19 attached to a binding post 20, and is arranged to cooperate with two fixed contact fingers 21 and 23. Finger 21 is fastened to plate 11 by means of binding post 22 and is engaged by finger 18 when the latter finger is in its left hand position. Finger 23 is supported by bracket 24 which is in turn supported on plate 11 by means of a binding post 25. These contact fingers may be electrically connected with the apparatus which it is desirable to control, by means of the binding posts 20, 25 and 22.

As shown in the drawing the parts are so arranged that roller 16 engages surface 33 of cam member B² and roller 15 engages surface 35 of member B′, and the structure G is therefore tipped in clockwise direction around pin 13 so that fingers 18 and 23 are in contact. In order to move finger 18 to the reverse position cam 3 is rotated in a clockwise direction (Fig. 1) by some suitable means such as a crank 5 attached to shaft 6. If cam B is moved in a clockwise direction, roller 16 will ride up on surface 35 of member B′, and roller 15, will be forced down onto surface 33 of member B², whereupon contact 18—23 will be opened and contacts 18—21 will be closed due to the counter clockwise tipping of structure G. When the cam is returned to its original position the same operation takes place in the reverse order.

Under some conditions it may be desirable to change the position of crank 5 at which the contact operation just described occurs. This may be accomplished by changing the relative position of cam member B' with respect to cam member B². For this purpose member B' is provided with a plurality of holes 39 to accommodate the shanks of bolts 28 and 29. To adjust the members to the proper relative positions, crank 5 is first moved to the desired position. Bolts 28 and 29 are then inserted in the proper holes 39 to place the two cam members in the approximately correct position. Final and accurate adjustment is then accomplished by turning bolt 29 by means of head $29^e$, thereby causing a slight relative angular movement of the two members due to the co-action of eccentric head $29^a$ and the walls of the slot 30. The cam members are then clamped together by tightening nuts $28^d$ and $29^d$.

If it is desired that contact 18—21 be closed when crank 5 is in the position shown, and that contact 18—23 be closed when the crank is in the opposite position, this result may be accomplished by turning the cam B bodily around on the shaft 6 so that surface 35 will be on the top and surface 34 on the bottom as viewed in Fig. 1.

If it is desired to interpose a period of delay between the opening of one contact and the closing of the other, that is, a period of complete open circuit during the motion of crank 5, it may be accomplished by the use of the modified cam C shown in Figs. 4, 5 and 6.

This cam C comprises three members C', C² and C³ adapted to be adjustably fastened together by means of two bolts 45 and 46. The member C² is circular in outline and is provided with two central hubs 50 and $50^a$ pierced by a hole 51 for receiving the shaft 6 to which it is fastened by means of a taper pin 53. The member C² is also provided with two holes 60 to accommodate the shanks of the two bolts 45 and 46. The members C³ and C' are each bolted to member C², one on either side, and each is provided with a central aperture to accommodate the hub $50^a$ or 50 of member C. Member C³ is provided with a closed segmental slot 43, an open U-shaped slot 44, and a projecting lug having two cam surfaces of two radial heights, surface 40 being farther removed from the center of the cam than surface 47. Spaced from the surfaces 40 and 47 and also outstanding from the surface of member C³ is a third cam surface 48 of the same radial height as surface 47. Member C' is also provided with a closed slot 43 and an open U-shaped slot 44 similar to slots 43 and 44 of member C³, and with two spaced cam surfaces 42 and 61 of the same radial height as surfaces 47 and 48 of cam member C'. Adjacent surface 42 of member C' is a cam surface 41 of the same height at surface 40 of member C³. The parts of the two members C' and C³ are oppositely disposed, whereby the three members C', C² and C³ may be assembled so that slot 43 of member C' and slot 44 of member C³ align with one hole 60 of member C², and slot 44 of member C' and slot 43 of member C³ align with the second hole 60 of member C². The shank $46^b$ of bolt 46 is then inserted in one hole 60 of member C² and slot 43 of member C³, thus allowing the eccentric shoulder $46^a$ of the bolt to seat in the U-shaped slot 44 of member C'. Similarly the shank of bolt 45 is inserted in the closed slot 43 of member C' and the remaining hole 60 of member C², and the eccentric shoulder of this bolt then seats in the U-shaped slot 44 of member C³. It should be observed that members C' and C³ are maintained in positions concentric with respect to member C² and hence with shaft 6 by means of fins formed by extending the cam surfaces of members C' and C³ over the edges of member C² as best shown at X in Fig. 5. It is obvious that members C' and C³ may be conveniently and accurately adjusted with respect to member C² by turning the eccentric shoulders on the two bolts 45 and 46, and the parts are then clamped in their adjusted positions by means of the nuts on these bolts.

As shown in Fig. 4, roller 16 has been moved to the left by surface 40 of member C³, and structure G is therefore swung in a counter-clockwise direction around pin 13 as a pivot causing roller 15 to engage surface 49 of member C². Contact 18—21 is therefore closed. If now, shaft 6 is rotated in a clockwise direction by means of crank 5, surface 48 of member C³ will engage roller 15, moving this roller to the left, and roller 16 will engage surface 47 of member C³ and surface 61 of member C'. Under these conditions finger 18 will occupy an intermediate position between the two fingers 21 and 23. As movement of shaft 6 is continued surface 41 of member C' will engage roller 15 and at the same time roller 16 will move off from surface 61 of member C' onto surface 49 of member C², thus moving finger 18 to the right and closing contact 18—23.

Although I have herein shown and described only two forms of cams embodying my invention, it is understood that various changes and modifications may be made therein within the scope of the appended claims without departing from the spirit and scope of my invention.

Having thus described my invention, what I claim is:

1. A cam comprising a cam member having a hole, a second cam member having a slot, a bolt having a stem adapted to enter said hole and an eccentric shoulder adapted to enter said slot, and a nut co-acting with said bolt to lock said two members together.

2. A cam having a central cam member provided with two holes, two outer cam members each provided with a slot, a bolt passing through one hole in said central member and having an eccentric head co-acting with the slot in one outer member, and a second bolt passing through the other hole in said central member and having an eccentric head co-acting with the slot in the other outer member.

3. A cam comprising a cam member having a plurality of holes, a second cam member having a slot, a bolt having a stem adapted to enter any one of said holes to provide rough relative adjustment of said members, and an eccentric shoulder on said bolt adapted to enter said slot to provide fine relative adjustment of said members.

In testimony whereof I affix my signature.

JAMES E. SPEER.